(12) United States Patent
Santry

(10) Patent No.: US 10,161,534 B2
(45) Date of Patent: Dec. 25, 2018

(54) MULTIPLE FLOW RATE HYDRANT

(71) Applicant: Charles N. Santry, Chestnut Hill, MA (US)

(72) Inventor: Charles N. Santry, Chestnut Hill, MA (US)

(*) Notice: Subject to any disclaimer, the term of this patent is extended or adjusted under 35 U.S.C. 154(b) by 99 days.

(21) Appl. No.: 15/047,754

(22) Filed: Feb. 19, 2016

(65) Prior Publication Data

US 2017/0241114 A1    Aug. 24, 2017

(51) Int. Cl.
*F16K 11/074* (2006.01)
*E03B 9/04* (2006.01)
*F25C 3/04* (2006.01)

(52) U.S. Cl.
CPC ............. *F16K 11/074* (2013.01); *E03B 9/04* (2013.01); *F25C 3/04* (2013.01); *Y10T 137/86501* (2015.04); *Y10T 137/86911* (2015.04); *Y10T 137/87249* (2015.04)

(58) Field of Classification Search
CPC .. F16K 11/074; E03B 9/04; Y10T 137/86911; Y10T 137/86501; Y10T 137/87249
See application file for complete search history.

(56) References Cited

U.S. PATENT DOCUMENTS

| | | | |
|---|---|---|---|
| 4,355,659 A | 10/1982 | Kelchner | |
| 6,161,769 A * | 12/2000 | Kircher | F25C 3/04 239/135 |
| 6,352,105 B1 * | 3/2002 | Serratto | F24F 3/08 137/597 |
| 6,983,764 B2 | 1/2006 | Arrowood, Jr. et al. | |
| 7,785,727 B2 * | 8/2010 | Degner | F16K 11/074 137/625.31 |
| 8,011,320 B2 * | 9/2011 | Danel | F16K 11/074 118/723 R |
| 8,286,664 B2 * | 10/2012 | Yan | F16K 11/0743 137/625.44 |
| 8,349,175 B1 * | 1/2013 | Oroskar | B01D 15/1842 210/198.2 |
| 8,459,302 B2 * | 6/2013 | Pederson | F16K 11/074 137/625.15 |
| 8,960,231 B2 * | 2/2015 | Picha | G01N 30/20 137/625.46 |
| 2003/0141377 A1 * | 7/2003 | Dupre | F25C 3/04 239/2.2 |

(Continued)

*Primary Examiner* — Matthew W Jellett
*Assistant Examiner* — Christopher Ballman
(74) *Attorney, Agent, or Firm* — Carothers & Carothers

(57) ABSTRACT

A hydrant for selectively valving and delivering fluid under pressure to a plurality of different fluid outlets. The hydrant housing has at least one fluid inlet and multiple fluid outlets. A valve operating shaft is mounted for axial rotation in the hydrant housing and positioned transversely to a valve seat having a first set of valve ports therethrough annularly arranged on a first circumference about the shaft, and a second set of valve ports are provided through the valve seat and annularly arranged on a concentric second circumference of different diameter than the first circumference about the shaft. A valve actuator disk secured for rotation with the operating shaft slidably engages the valve seat in a rotary fashion to selectively valve the valve ports open and closed in selected combinations with rotation of the shaft to preselected positions of rotation.

4 Claims, 7 Drawing Sheets

STAGE 5

(56) References Cited

U.S. PATENT DOCUMENTS

| | | | | |
|---|---|---|---|---|
| 2005/0006493 A1* | 1/2005 | Stofner | ................... | F25C 3/04 |
| | | | | 239/14.1 |
| 2011/0240756 A1* | 10/2011 | Santry | ..................... | F25C 3/04 |
| | | | | 239/14.2 |
| 2016/0290698 A1* | 10/2016 | Dodson | ................... | F25C 3/04 |
| 2016/0341323 A1* | 11/2016 | Wu | ...................... | B01D 35/04 |
| 2017/0152956 A1* | 6/2017 | Sansum | .............. | F16K 11/074 |

* cited by examiner

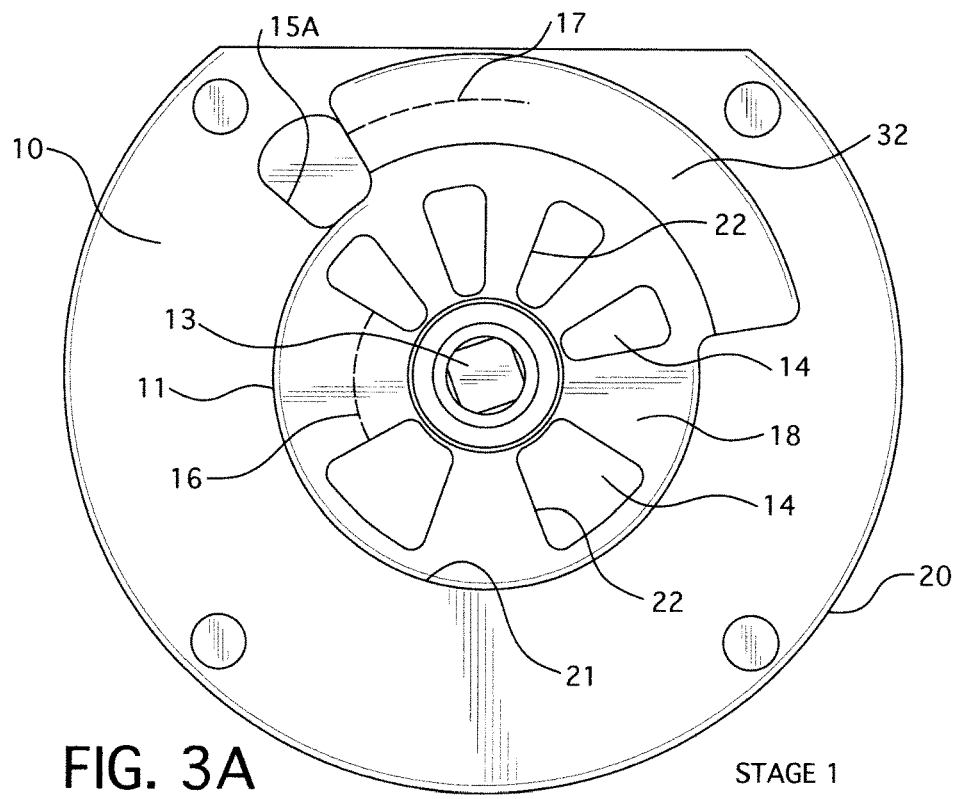
FIG. 3A  STAGE 1
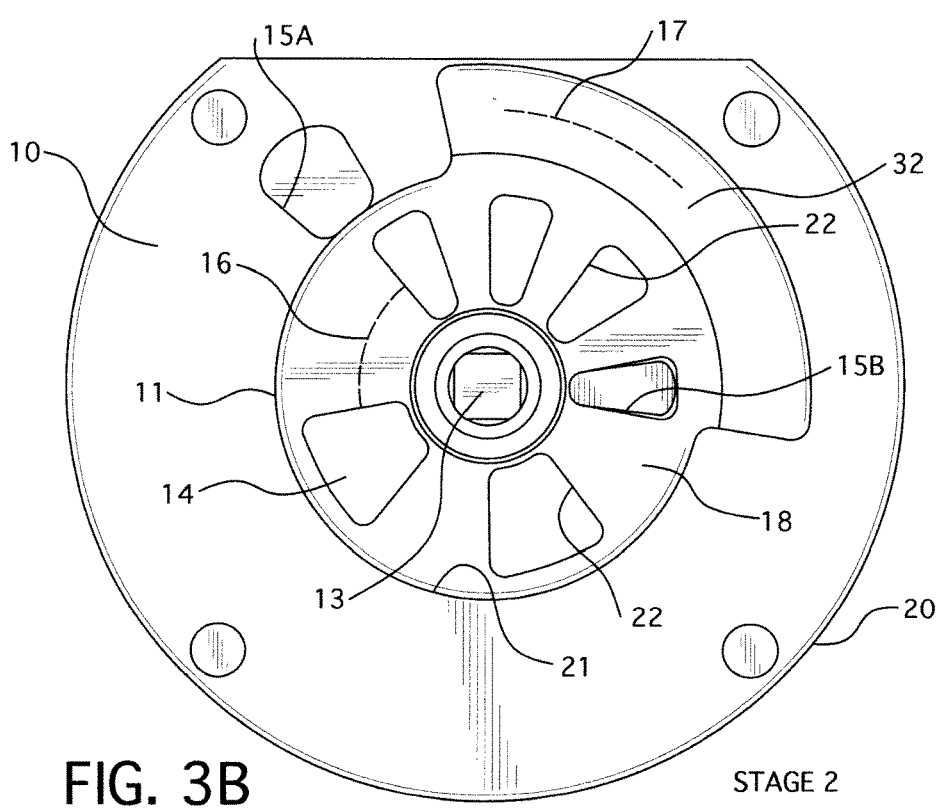
FIG. 3B  STAGE 2

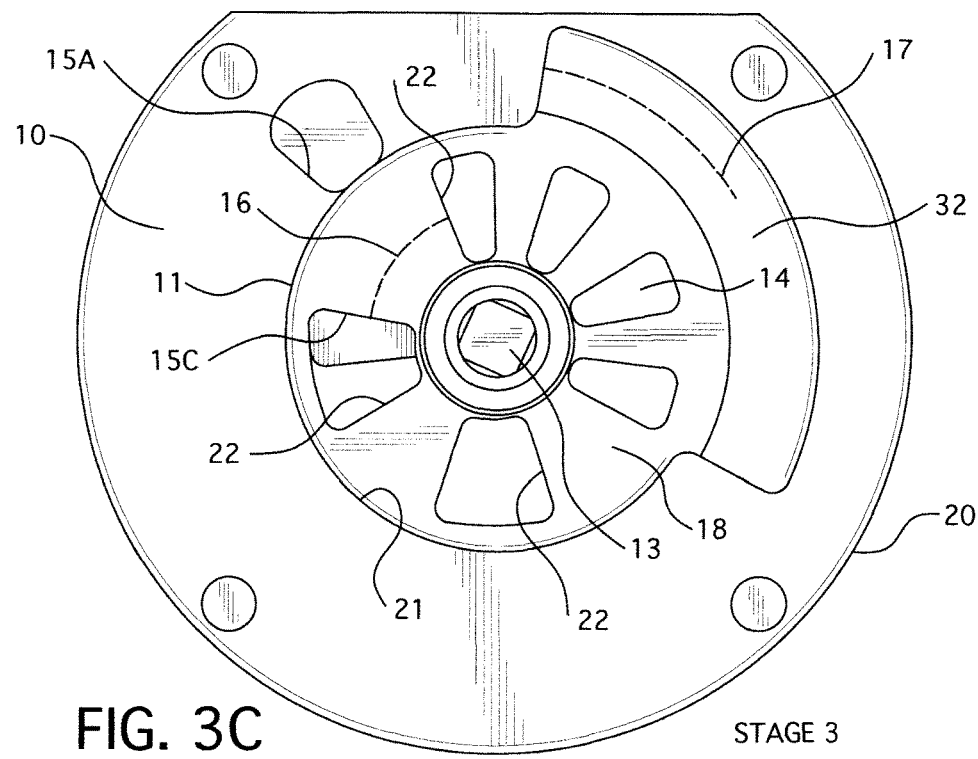
FIG. 3C STAGE 3
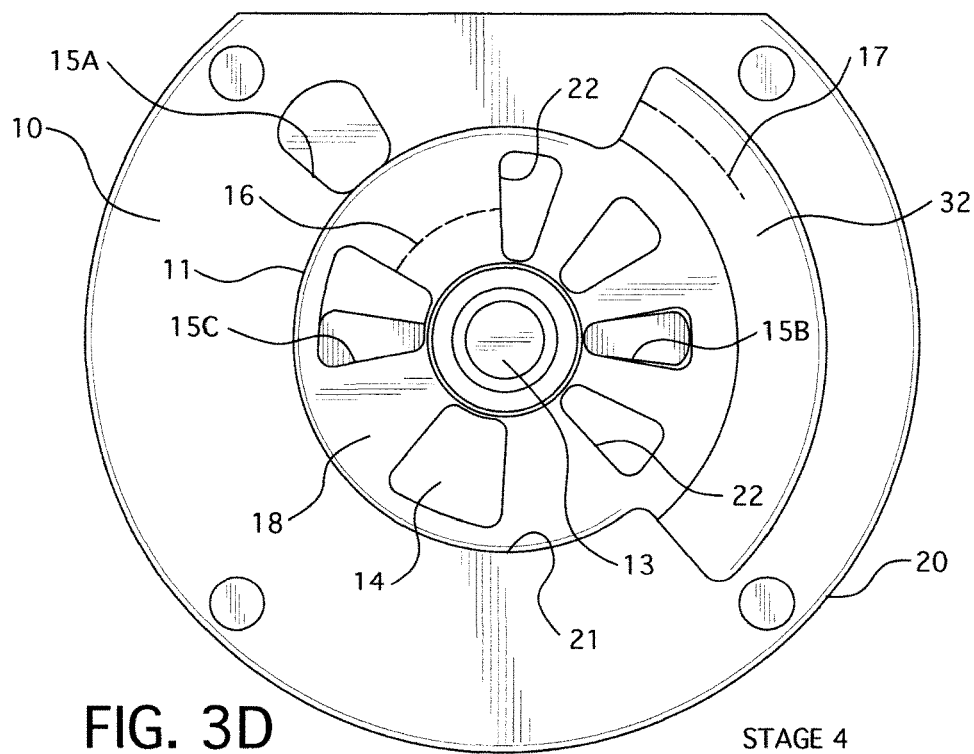
FIG. 3D STAGE 4

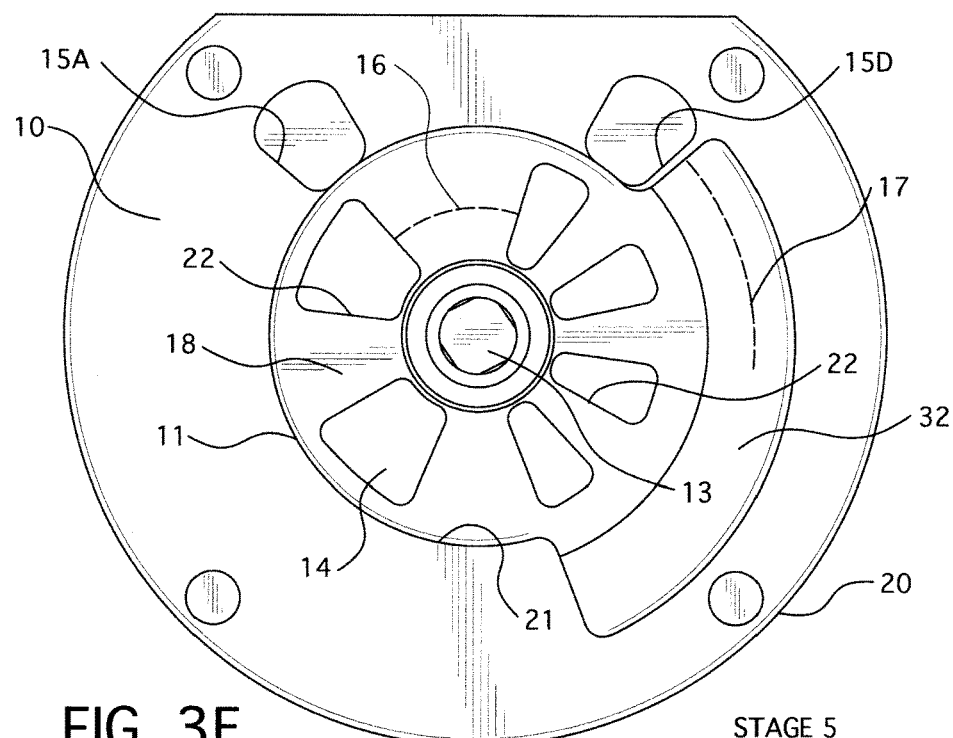
FIG. 3E  STAGE 5
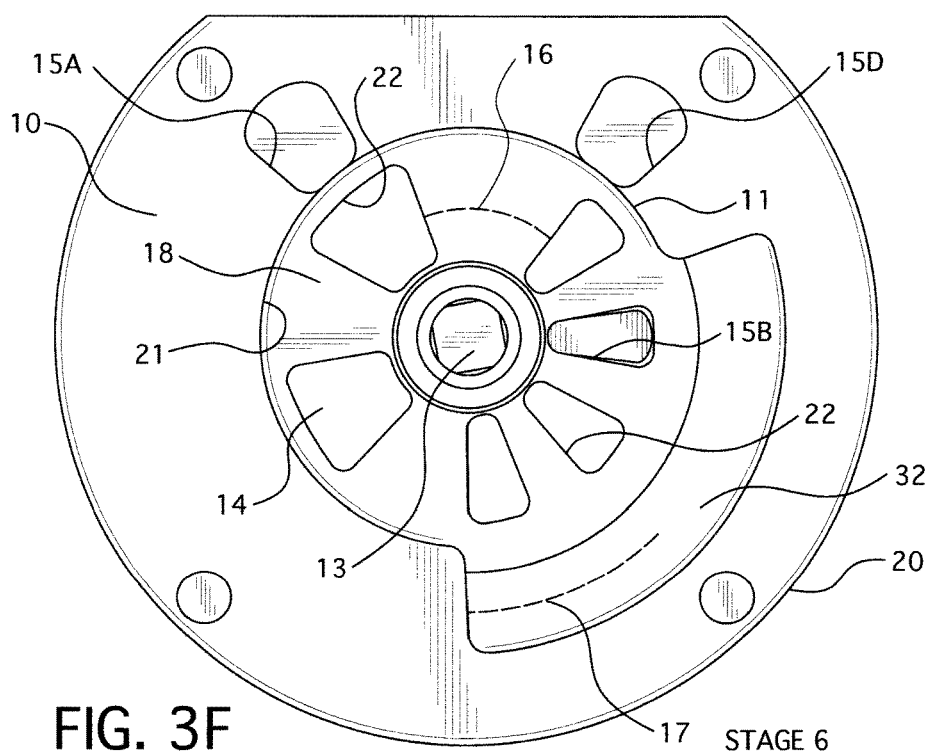
FIG. 3F  STAGE 6

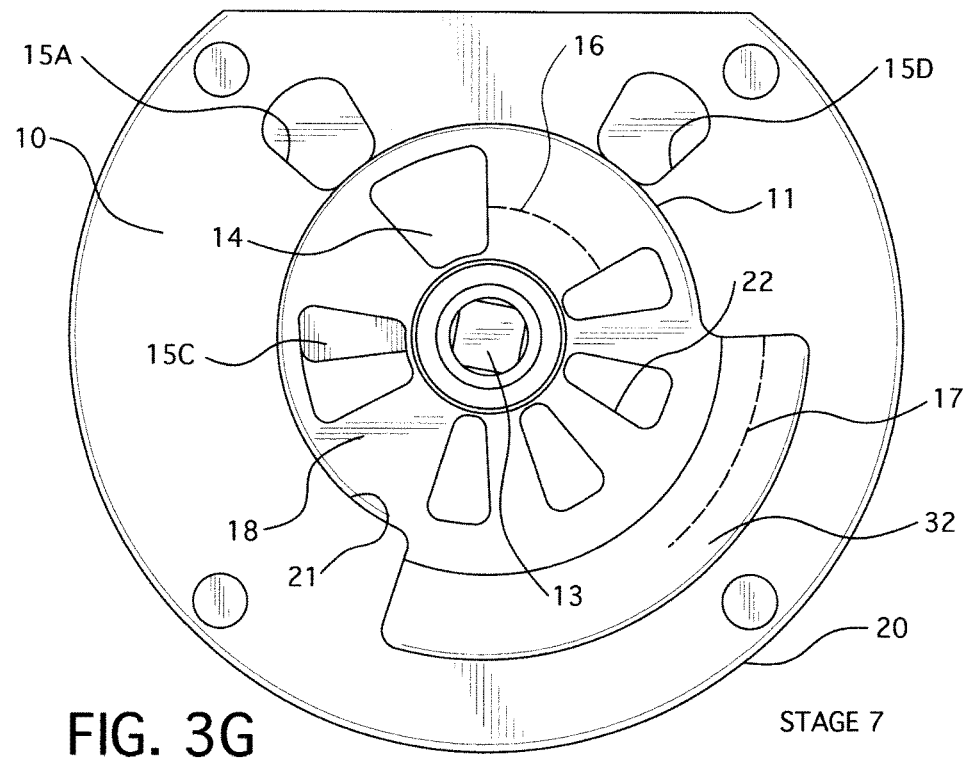
FIG. 3G  STAGE 7
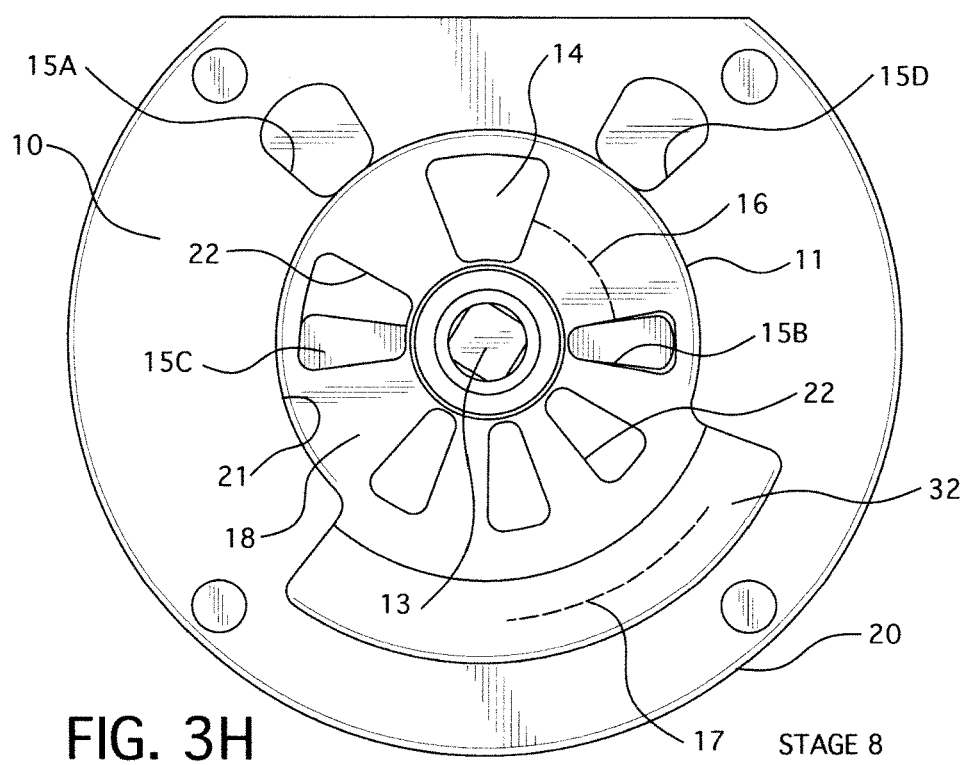
FIG. 3H  STAGE 8

| Outlet Port Opening | GPM/Opening | Stage (Opening Combinations) | Total gun GPM / CFM |
|---|---|---|---|
| 12A | 20 | 1 (12A) | 20 / 48 |
| 12B | 5 | 2 (12A + 12B) | 25 / 48 |
| 12C | 10 | 3 (12A + 12C) | 30 / 48 |
| 12D | 15 | 4 (12A + 12B + 12C) | 35 / 48 |
| | | 5 (12A + 12D) | 35 / 8 |
| | | 6 (12A + 12D + 12B) | 40 / 8 |
| | | 7 (12A + 12D + 12C) | 45 / 8 |
| | | 8 (12A + 12D + 12C + 12B) | 50 / 8 |

MULTIPLE FLOW RATE HYDRANT

BACKGROUND OF THE INVENTION

This invention relates generally to the art of valves, and more particularly to a hydrant capable of providing multiple flow rates.

Snow making apparatus of the type disclosed in U.S. Pat. No. 6,543,699 supply air and water under pressure to the top of a snow making tower where it is discharged under pressure through nozzles to form plumes of atomized water for producing snow in sub-freezing conditions. In actuality, the air supplied under pressure may be internally mixed with the primary water before it is discharged, or alternatively, the air under pressure may be discharged externally into the plumes of atomized water.

Additional or secondary water nozzles are positioned at the top of the tower to discharge more water in the form of spray. This additional supply of secondary water is independently valved for different ambient temperature conditions. The problem arises that the selective independent supply of additional water and the actuation also of the air supply must all be accomplished separately or independently as temperature conditions change. This, of course, requires multiple respective actuators to energize the different nozzles sets, and in addition, this arrangement is not conducive to remote actuation.

It is a principal object of the present invention to provide a water hydrant which not only can provide a selection of multiple output supply ports, but in addition, is capable of providing multiple output flow rates with different selected output port combinations.

SUMMARY OF THE INVENTION

The hydrant of the present invention provides selective valving and delivery of fluid under pressure to a plurality of different fluid outlets. The hydrant includes a multiple port valve having a hydrant valve housing with at least one fluid inlet and multiple fluid outlets in the hydrant. A valve operating shaft is mounted for axial rotation in the housing and is positioned transversely to a valve seat having a first set of valve ports therethrough which are annularly arranged on a first circumference about the shaft. A second set of valve ports are also provided through the valve seat and are annularly arranged on a concentric second circumference of different diameter than the first circumference about the shaft. These valve ports are connected respectively to corresponding fluid outlet ports in the hydrant.

A valve actuator disk is secured for rotation with the shaft for slidably engaging the valve seat to selectively valve the valve ports of the valve seat open and closed in selected combinations with rotation of the shaft to preselected positions of rotation.

The fluid outlets of the hydrant may respectively be of different size whereby when selecting different rotary positions for the valve actuator disk by rotating the shaft, different combinations of the valve ports are valved open for thereby selecting different total flow combinations from the fluid outlets of the hydrant. In the example hereinafter described, four valve port openings are provided on two different circle diameters of the valve seat, two valve ports per circle, are provided and through opening and closing different combinations of the valve ports in the valve seat, eight different water flow outputs may be obtained through the hydrant of the present invention.

In the example of the hydrant of the present invention disclosed hereinafter, the valve actuator consists of a disk having the valve apertures arranged on a circumference of the disk which coincides with the first inner circumference of the valve seat for selectively valving the valve ports on the first circumference open and closed in predetermined combinations. The disk further includes at least one radial outward extension thereon for selectively valving the valve ports on and off on the second or outer circumference of the valve seat. In addition, four situations wherein valving of air is also required, such as for the supply of water and air under pressure to snow making towers, the hydrant may also include an air inlet and an air outlet, and an air valve for valving air under pressure from the air inlet to the air outlet, wherein this air valve is also actuated by the valve operating shaft of the hydrant.

BRIEF DESCRIPTION OF THE DRAWINGS

Other objects and advantages appear hereinafter in the following description and claims. The accompanying drawings show, for the purpose of exemplification, without limiting the scope of the invention or appended claims, certain practical embodiments of the present invention wherein:

FIGS. 3A-3H show the valve actuator disk for the hydrant as mounted on the valve seat, and the figures sequentially represent fluid being supplied to a possible four different outlet ports in the valve seat to selectively provide a possible eight different fluid flow outlets with a possible of eight different hydrant outlet fluid flows as outlined in the table of FIG. 4; and FIG. 4 is a table showing eight possible fluid outlet flow rates achievable with the hydrant of the present invention as illustrated by the example described.

DETAILED DESCRIPTION OF A PREFERRED EMBODIMENT

Figure 1:
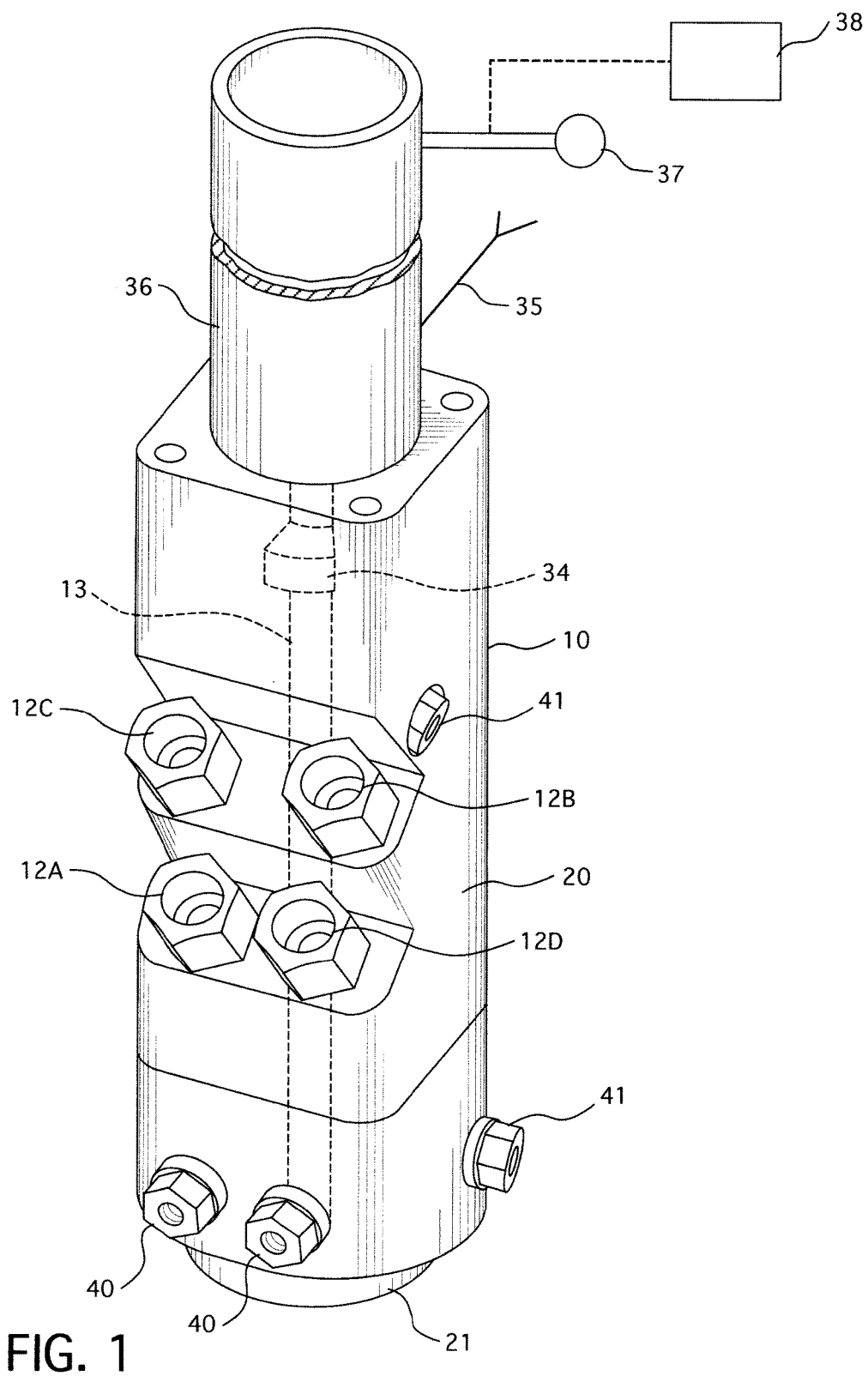
FIG. 1 is an isometric schematic representation of the hydrant of the present invention.
Figure 2:
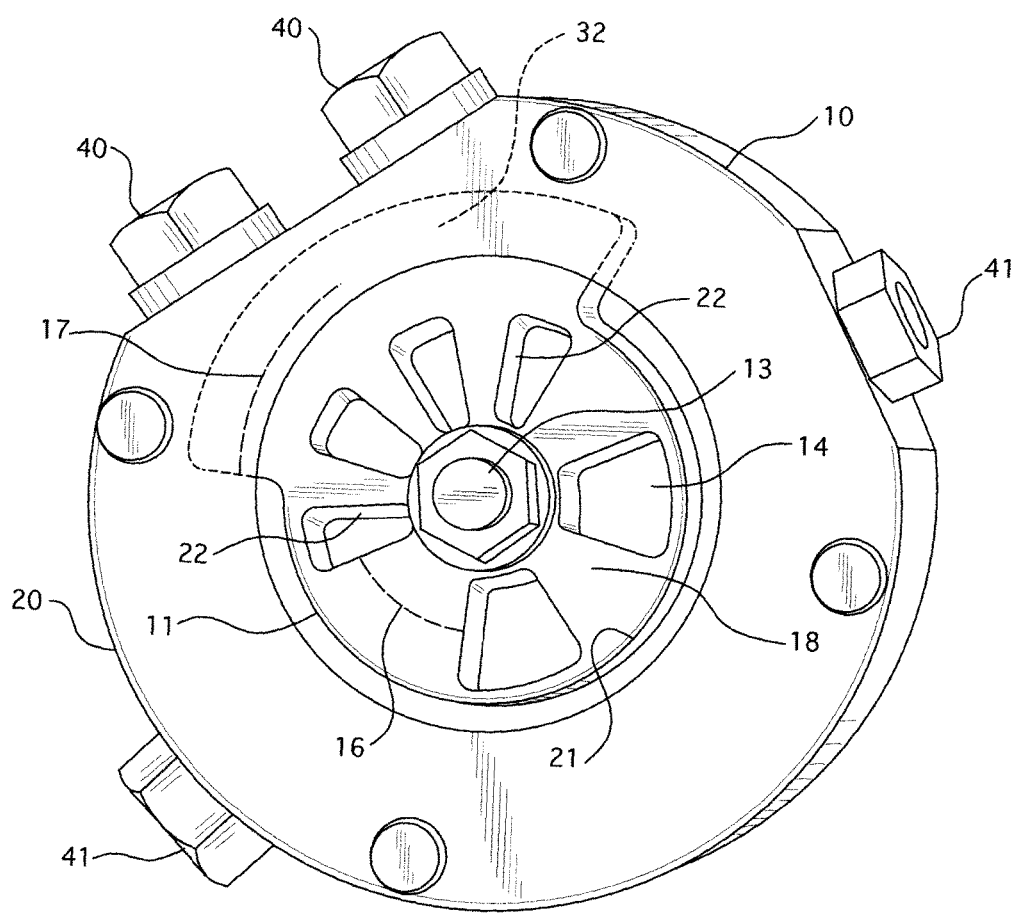
FIG. 2 is a bottom isometric view of the hydrant shown in FIG. 1 exposing the actuator disk of the multiple port valve for the hydrant of the present invention.

Referring to FIGS. 1 and 2, the hydrant 10 of the present invention is provided for supplying water and air under pressure where required, such as to a snow making apparatus (not shown). The hydrant 10 includes a hydrant housing 20 having a water inlet 21 at the bottom thereof for supplying water under pressure to the multiple port valve 11 in the bottom of the hydrant 10. The housing 20 is provided with four fluid outlets 12A, 12B, 12C and 12D.

Valve operating shaft 13 is mounted for axial rotation in housing 20 and is positioned transversely to valve seat 14 having a first set of two valve seat outlet ports 15B and 15C. Valve seat outlet ports 15B and 15C are annularly arranged on valve seat 14 on a first inner circumference 16 about shaft 13, and a second set of valve seat outlet ports 15A and 15D provide a second set of valve ports through valve seat 14 which are annularly arranged thereon on a concentric second outer circumference 17 having a larger or different diameter than first circumference 16 about shaft 13. As shown in the drawings, the first and second sets of valve ports do not share a circumference. Valve seat outlet ports 15A and 15D are respectively connected to hydrant fluid outlets 12A and 12D for supplying these water outlets respectively with water under pressure. Valve seat outlet ports 15D and 15C are respectively connected to hydrant fluid outlets 12B and 12C.

Valve actuator disk 18 of multiple port valve 11 is secured for rotation with shaft 13 to slidably engage valve seat 14 in rotation to selectively valve the valve ports 15A-15D open and closed in selective combinations with rotation of shaft 13 to preselected positions of rotation.

Valve actuator disk 18 is provided with multiple valve apertures 22 on inner first circumference 16 for selectively valving valve ports 15B and 15C on the first circumference 16 of the valve seat 14 in predetermined combinations. Valve actuator disk 18 is further provided with a radially extending outward extension 32 for selectively valving valve ports 15A and 15D on and off on second outer circumference 17 of valve seat 14.

The fluid outlets 12A-12D of housing 20 are respectively of different size whereby by selecting different rotary positions for valve actuator disk 18 by rotating shaft 13 different combinations of valve ports 12A-12D are selected for thereby selecting different total flow combinations from the fluid outlets 12A-12D of hydrant 10.

The hydrant 10 is thereby designed to provide eight different water flows through the hydrant 10 as is sequentially illustrated by FIGS. 3A through 3H and the table of FIG. 4. Eight different stages of rotation for valve actuator disk 18 are respectively illustrated in FIGS. 3A through 3H. Since the outlet ports 12A-12D are each of a different opening or flow capacity, eight different flow rates may be attained at the output of hydrant 10.

Referring to FIG. 3A and the table of FIG. 4, stage one of eight possible stages for the valve actuator disk 18 is illustrated. In FIG. 2, all outlet ports of 15A though 15D of valve seat 14 are closed. FIG. 3A shows the valve actuator disk 18 being rotated clockwise to the first stage wherein valve outlet port 15A is open thereby supplying water under pressure only to hydrant outlet 12A. Air valve 34 supplied with air under pressure at air inlet 35 is also opened at stage 1 and remains open for the remainder stages 2-8. With reference to the table of FIG. 4, we can see that the opening for outlet 12A is designed to provide 20 gpm of water flow. The hydrant 10 in stage 1 is therefore providing a total water gpm output of 20 and a total cfm output of 48 for the air. The air passes upward through column 36 and exits at the top thereof.

When the actuator disk 18 is rotated again clockwise to stage 2 as illustrated in FIG. 3B, the result is that valve seat outlet ports 15A and 15B are opened. Referring to FIG. 4, the gpm opening of outlet 12B is 5 gpm and the total output of hydrant 10 from combined outlets 12A and 12B is 25 gpm of water and 48 cfm of air.

When actuator disk 18 is rotated clockwise further to stage 3 as illustrated in FIG. 3C, the gpm opening of outlet 12C is 10 gpm and ports 15A and 15C are open providing hydrant 10 with a total gpm water output of 30, with a cfm output of 48 of air.

When actuator disk 18 is rotated clockwise again to stage 4 as illustrated in FIG. 3D of valve outlet ports 12A, 12B and 12 D are exposed or opened. Since the gpm opening of outlet 12D is 15 gpm, the total water output of hydrant 10 is 35 gpm at 48 cfm of air.

When actuator disk 18 is rotated further to the clockwise position of stage 5 illustrated in FIG. 3E, valve ports 15A and 15D are opened thereby providing a total water output from hydrant 10 of 35 gpm with a reduced air output of 8 cfm. In stages 5, 6, 7 and 8, the air valve 34 is valved down to provide a lesser cfm of output of 8 with larger output supplies of water under from a low of 35 gpm up to 50 gpm in stage 8 for colder ambient conditions for manufacturing snow with snow making equipment with less required air pressure and more water.

The hydrant 10 may be controlled by rotating column 36, which in turn rotates shaft 13, by hand manipulation of knob 37. However, in the alternative, the multiple port valve 11 may be operated remotely through electronic control 38.

Drain ports 40 and 41 are automatic drains which drain the hydrant 10 of any water in the air line and of any water in the bottom of the hydrant 10 which automatically open and drain the system when a predetermined minimum pressure within hydrant 10 is obtained.

I claim:

1. A hydrant for selectively valving and delivering fluid under pressure to a plurality of different fluid outlets, comprising:
   a multiple port valve in said hydrant including a hydrant valve housing having at least one fluid inlet and multiple fluid outlets;
   a valve operating shaft mounted for axial rotation in said housing and positioned transversely to a valve seat having a first set of valve ports therethrough annularly arranged on a first circumference about said shaft and a second set of valve ports therethrough annularly arranged on a concentric second circumference of different diameter than said first circumference about said shaft, said valve ports connected respectively to said fluid outlet ports, said first and second sets of valve ports not sharing a circumference; and
   a valve actuator disk secured for rotation with said shaft for slidably engaging said valve seat in rotation thereon to selectively valve said valve ports open and closed in selected combinations with rotation of said shaft to preselected positions of rotation.

2. The hydrant of claim 1, wherein said fluid outlets are respectively of different size whereby by selecting different rotary positions for said valve actuator disk by rotating said shaft different combinations of said valve ports are selected for thereby selecting different total flow combinations from the fluid outlets of said hydrant.

3. The hydrant of claim 1, said valve actuator consisting of a disk having valve apertures arranged on a circumference of said disk which coincides with said first circumference on said valve seat for selectively valving said valve ports on said first circumference open and closed in predetermined combinations, and at least one radial outward extension on said disk for selectively valving said valve ports on and off on said second circumference of said valve seat.

4. The hydrant of claim 1, wherein said hydrant includes an air inlet and an air outlet and an air valve for valving air under pressure from said air inlet to said air outlet, said air valve actuated with said valve operating shaft.

\* \* \* \* \*